US011862124B2

(12) United States Patent
Hong et al.

(10) Patent No.: US 11,862,124 B2
(45) Date of Patent: Jan. 2, 2024

(54) DATA TRANSMISSION/RECEPTION SYSTEM AND DATA TRANSMISSION/RECEPTION METHOD OF DATA DRIVING DEVICE AND DATA PROCESSING DEVICE

(71) Applicant: LX Semicon Co., Ltd., Daejeon (KR)

(72) Inventors: Ho Sung Hong, Daejeon (KR); Gi Baek Choi, Daejeon (KR); Sang Min Lee, Daejeon (KR); Jung Bae Yun, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 17/779,508

(22) PCT Filed: Nov. 13, 2020

(86) PCT No.: PCT/KR2020/016001
§ 371 (c)(1),
(2) Date: May 24, 2022

(87) PCT Pub. No.: WO2021/132884
PCT Pub. Date: Jul. 1, 2021

(65) Prior Publication Data
US 2023/0014733 A1 Jan. 19, 2023

(30) Foreign Application Priority Data
Dec. 23, 2019 (KR) ........................ 10-2019-0172854

(51) Int. Cl.
*G09G 5/00* (2006.01)

(52) U.S. Cl.
CPC ..... *G09G 5/006* (2013.01); *G09G 2310/0275* (2013.01); *G09G 2320/0247* (2013.01);
(Continued)

(58) Field of Classification Search
CPC ..................................................... G09G 5/006
See application file for complete search history.

(56) References Cited

U.S. PATENT DOCUMENTS 9,589,524 B2 3/2017 Park
10,163,386 B2 12/2018 Lee et al.
(Continued)

FOREIGN PATENT DOCUMENTS

CN 1703839 A 11/2005
CN 101763840 A 6/2010
(Continued)

OTHER PUBLICATIONS

Korean Office Action dated Jul. 18, 2023 issued in Patent Application No. 10-2019-0172854 (54 pages).
(Continued)

*Primary Examiner* — Gustavo Polo
(74) *Attorney, Agent, or Firm* — POLSINELLI PC

(57) ABSTRACT

The present disclosure relates to a data transmission and reception method of a data driving device and a data processing device as well as a data transmission and reception system, and more particularly, to a method and a system in which the data driving device receives an initial configuration value from the data processing device, stores the initial configuration value as a configuration restoration value, and rapidly restore an environment for a high-speed communication by using the stored configuration restoration value when a link between the data processing device and the data driving device is lost so as to reduce a time for restoration.

16 Claims, 8 Drawing Sheets

(52) U.S. Cl.
CPC ..... *G09G 2330/12* (2013.01); *G09G 2370/08* (2013.01); *G09G 2370/14* (2013.01)

(56) References Cited

U.S. PATENT DOCUMENTS

| | | | | |
|---|---|---|---|---|
| 10,504,412 | B2 | 12/2019 | Han et al. | |
| 10,770,025 | B2 | 9/2020 | Kim et al. | |
| 2017/0132966 | A1 | 5/2017 | Lim et al. | |
| 2018/0012229 | A1 | 1/2018 | Roberts et al. | |
| 2020/0251036 | A1* | 8/2020 | Kim | G09G 5/008 |

FOREIGN PATENT DOCUMENTS

| | | | |
|---|---|---|---|
| CN | 104751757 | A | 7/2015 |
| CN | 108010488 | A | 5/2018 |
| CN | 109785806 | A | 5/2019 |
| CN | 109949734 | A | 6/2019 |
| CN | 110088822 | A | 8/2019 |
| CN | 110246468 | A | 9/2019 |
| JP | 2009192652 | A | 8/2009 |
| KR | 20170029711 | A | 3/2017 |
| KR | 20170053370 | A | 5/2017 |
| KR | 10-1808344 | B1 | 12/2017 |
| KR | 10-2018-0045923 | A | 5/2018 |
| KR | 10-2019-0065626 | A | 6/2019 |
| KR | 20190075591 | A | 7/2019 |
| KR | 20190077937 | A | 7/2019 |

OTHER PUBLICATIONS

Chinese Office Action dated Oct. 12, 2023 issued in Patent Application No. 202080072220.9 (13 pages).

* cited by examiner

DATA TRANSMISSION/RECEPTION SYSTEM AND DATA TRANSMISSION/RECEPTION METHOD OF DATA DRIVING DEVICE AND DATA PROCESSING DEVICE

CROSS-REFERENCE TO RELATED APPLICATION

This application is a national stage entry of PCT/KR2020/016001 filed Nov. 13, 2020 which claims priority under 35 U.S.C. 119(a) from Korean Patent Application No. 10-2019-0172854 filed on Dec. 23, 2019 in the Korean Intellectual Property Office, the disclosure of which is herein incorporated by reference in its entirety. In addition, this application claims priority in countries other than the United States for the same reason, and disclosure of which is herein incorporated by reference in its entirety.

TECHNICAL FIELD

The present disclosure relates to a data transmission and reception method of a data driving device and a data processing device and a data transmission and reception system.

BACKGROUND ART

A display panel comprises a plurality of pixels arranged in a form of a matrix and each pixel comprises a red sub-pixel (R), a green sub-pixel (G), a blue sub-pixel (B), etc. Each sub-pixel emits light according to a greyscale based on image data to display an image on a display panel.

Image data is transmitted from a data processing device, referred to as a timing controller, to a data driving device, referred to as a source driver. Image data is transmitted in a form of a digital value and the data driving device converts the image data into an analog voltage to drive each sub-pixel.

Since image data individually or separately indicates a greyscale value of each pixel, as the number of pixels disposed in a display panel increases, the amount of image data increases. In addition, as the frame rate increases, the amount of image data to be transmitted within a unit time also increases.

Recently, since display panels have high resolutions, both the number of pixels disposed in a display panel, the frame rate increase and, in order to process an increased amount of image data, the speed of a data communication in a display device becomes high.

Meanwhile, when a data processing device and a data driving device are initially driven, in other words, right after power is applied to a display device, an environment for a high-speed communication between the data processing device and the data driving device needs to be configured.

Here, if a configuration of a high-speed communication environment is performed by using a high-speed communication, errors may occur due to the high speed. For this reason, the configuration of a high-speed communication environment is performed by using a low-speed communication having a clock frequency lower than that of the high-speed communication.

The data driving device performs a low-speed communication with the data processing device, in other words, performs a configuration of a high-speed communication environment, and then, synchronizes communication clocks by a clock training.

After having completed the clock training, the data processing device may transmit image data to the data driving device by a high-speed communication so that the data driving device may output an image to a display panel. That is, a display device normally operates in this way.

Meanwhile, when noise, such as static, occurs inside a display device while the display device operates, a phenomenon, such as desynchronization of clocks of the data processing device and the data driving device, may occur. In other words, there may be abnormality in a high-speed communication between the data processing device and the data driving device.

In such a case, the data processing device and the data driving device need to again perform a low-speed communication in order to re-configure the environment for a high-speed communication.

Since a low-speed communication generally takes more time than a high-speed communication, there may be image degradation such as blinks of a screen while the environment for a high-speed communication is re-configured by using a low-speed communication.

DETAILED DESCRIPTION OF THE INVENTION

Technical Problem

In this background, an aspect of the present disclosure is to provide a technique for preventing image degradation when re-configuring an environment for a high-speed communication between a data processing device and a data driving device.

Technical Solution

To this end, in an aspect, the present disclosure provides a data transmission and reception method of a data driving device comprising: configuring an environment for a high-speed communication with a data processing device by performing a low-speed communication with the data processing device, the low-speed communication having a clock frequency lower than that of the high-speed communication; receiving a clock pattern from the data processing device and performing a clock training; storing an initial configuration value as a configuration restoration value after having received the initial configuration value regarding the environment for a high-speed communication from the data processing device; and restoring the environment for a high-speed communication according to the configuration restoration value when any abnormality is detected in the high-speed communication while periodically receiving image data from the data processing device by the high-speed communication and processing the image data.

The data transmission and reception method may further comprise after restoring the environment for a high-speed communication: receiving a clock pattern from the data processing device by the high-speed communication and re-performing the clock training after having received; and re-performing the low-speed communication with the data processing device in order to re-configure the environment for the high-speed communication when the re-performed clock training is not completed.

In performing a clock training, the data driving device may transmit a first status signal indicating the completion of the clock training and, when any abnormality is detected in the high-speed communication while restoring configuration of the environment, transmit a second status signal changed from the first status signal to the data processing device.

The data transmission and reception method may further comprise after storing an initial configuration value: receiving an initial configuration value from the data processing device and comparing the initial configuration value with the configuration restoration value; re-configuring the environment for a high-speed communication by performing the low-speed communication with the data processing device when the initial configuration value is different from the configuration restoration value; receiving a clock pattern from the data processing device and re-performing the clock training; and receiving a re-configuration value for re-configuring the environment for a high-speed communication and updating the configuration restoration value with the re-configuration value.

The data transmission and reception method may further comprise after storing an initial configuration value: periodically checking whether any error occurs in the stored configuration restoration value; re-receiving an initial configuration value from the data processing device when any error is confirmed in the configuration restoration value; and updating the configuration restoration value having an error with the re-received initial configuration value.

An initial configuration value may comprise a frequency bandwidth for a high-speed communication and a configuration value for an equalizer comprised in the data driving device.

In another aspect, the present disclosure provides a data transmission and reception method of a data processing device comprising: configuring an environment for a high-speed communication with a data driving device by performing a low-speed communication with the data driving device, the high-speed communication having a clock frequency higher than that of the low-speed communication; storing an initial configuration value regarding the environment for the high-speed communication; transmitting the initial configuration value to the data driving device after having transmitted a clock pattern indicating a communication clock for the data driving device; and periodically transmitting image data to the data driving device by the high-speed communication.

The data transmission and reception method may further comprise after transmitting the initial configuration value: periodically checking whether any error occurs in the stored initial configuration value; receiving from the data driving device a configuration restoration value, which is an initial configuration value stored in the data driving device, when any error is confirmed in the stored initial configuration value; and updating the stored initial configuration value with the configuration restoration value.

The data processing device may check whether any error occurs in the stored initial configuration value by using at least one of a parity check method, a cyclical redundancy check (CRC) method, and a checksum method.

The data processing device may receive the configuration restoration value in a form of a low-voltage differential signaling (LVDS).

The data processing device may transmit the clock pattern to the data driving device by using the low-speed communication, and then, transmit the initial configuration value to the data driving device by using the high-speed communication.

In still another aspect, the present disclosure provides a data transmission and reception system comprising: a data processing device to store an initial configuration value regarding an environment for a high-speed communication, to transmit a clock pattern indicating a communication clock, to transmit the initial configuration value, to periodically transmit image data by using a high-speed communication; and a data driving device to perform a low-speed communication with the data processing device in order to configure an environment for the high-speed communication, the low-speed communication having a clock frequency lower than that of the high-speed communication, to receive the clock pattern to train the communication clock according to the clock pattern, to receive the initial configuration value and to store the same as a configuration restoration value, and to restore the configuration of the environment for the high-speed communication according to the configuration restoration value when any abnormality is detected in the high-speed communication while periodically receiving image data by using the high-speed communication and processing the same.

The data processing device may periodically check whether any error occurs in the stored initial configuration value and, when any error is confirmed in the stored initial configuration value, receive the configuration restoration value from the data driving device to update the stored initial configuration value with the configuration restoration value.

The data transmission and reception system may further comprise a main line through which the initial configuration value, the clock pattern, and the image data are transmitted from the data processing device to the data driving device; and an auxiliary line through which the configuration restoration value is transmitted from the data driving device to the data processing device.

The auxiliary line may be a low-voltage differential signaling (LVDS) bus line.

The data processing device may transmit image data to the data driving device in every frame and, in a frame blank section between one frame and another frame, transmit a stored initial configuration value to the data driving device.

The data driving device may compare the stored initial configuration value with the configuration restoration value and perform the low-speed communication with the data processing device in order to re-configure the environment for the high-speed communication when the stored initial configuration value is different from the configuration restoration value.

Effects of the Invention

As described above, according to the present disclosure, since the data driving device receives an initial configuration value from the data processing device and stores the initial configuration value as a configuration restoration value, the data driving device may promptly restore the configuration of the environment for a high-speed communication with the stored configuration restoration value when the link between the data processing device and the data driving device is lost. In this way, it is possible to reduce the time for restoring the link between the data processing device and the data driving device.

MODE FOR IMPLEMENTING THE INVENTION

Figure 1:
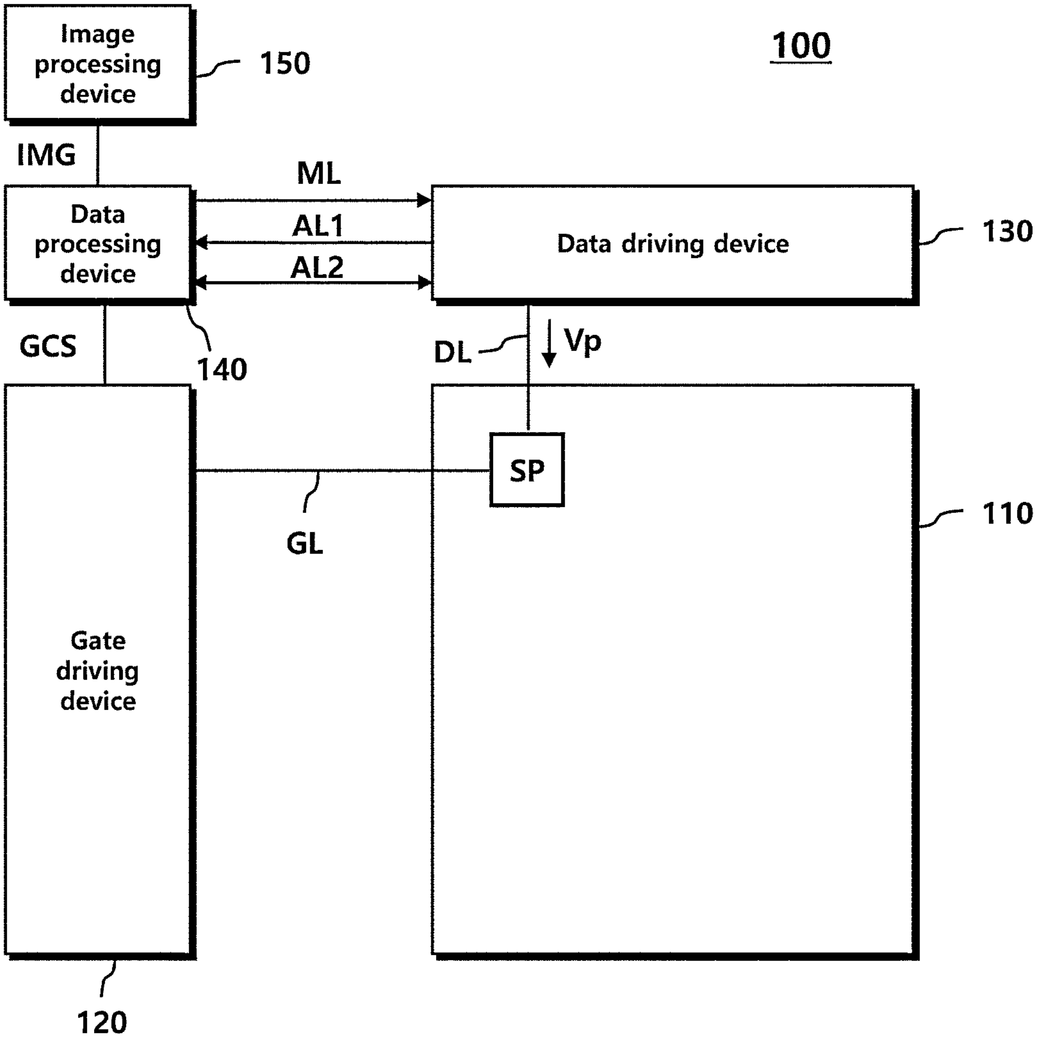
FIG. 1 is a configuration diagram of a display device according to an embodiment.

Hereinafter, some embodiments of the present disclosure will be described in detail with reference to the accompanying drawings. With regard to the reference numerals of the components of the respective drawings, it should be noted that the same reference numerals are assigned to the same components even though they are shown in different drawings. In addition, in describing the present disclosure, a detailed description of a well-known configuration or function related the present disclosure, which may obscure the subject matter of the present disclosure, will be omitted.

In addition, terms, such as "1st", "2nd", "A", "B", "(a)", "(b)", or the like, may be used in describing the components of the present disclosure. These terms are intended only for distinguishing a corresponding component from other components, and the nature, order, or sequence of the corresponding component is not limited to the terms. In the case where a component is described as being "coupled", "combined", or "connected" to another component, it should be understood that the corresponding component may be directly coupled or connected to another component or that the corresponding component may also be "coupled", "combined", or "connected" to the component via another component provided therebetween.

FIG. 1 is a configuration diagram of a display device according to an embodiment.

Referring to FIG. 1, a display device 100 may comprise a display panel 110, a gate driving device 120, a data driving device 130, and a data processing device 140.

In the display panel 110, a plurality of data lines DL and a plurality of gate lines GL may be disposed and a plurality of pixels P may also be disposed. A pixel may comprise a plurality of sub-pixels SP. Here, each of the sub-pixels may be a red sub-pixel R, a green sub-pixel G, a white sub-pixel W, etc. A pixel may comprise RGB sub-pixels, RGBG sub-pixels or RGBW sub-pixels.

The gate driving device 120, the data driving device 130, and the data processing device 140 are to generate signals to display an image in the display panel 110.

The gate driving device 120 may supply a gate driving signal of a turn-on voltage or a turn-off voltage to a gate line GL. When a gate driving signal of a turn-on voltage is suppled to a sub-pixel SP, the sub-pixel SP may be connected with a data line DL. When a gate driving signal of a turn-off voltage is supplied to the sub-pixel SP, the sub-pixel SP may be disconnected from the data line DL. The gate driving device 120 may be referred to as a gate driver.

The data driving device 130 may supply a data voltage Vp to a sub-pixel through a data line DL. The data voltage Vp supplied through the data line DL may be supplied to the sub-pixel SP according to a gate driving signal. The data driving device 130 may be referred to as a source driver.

The data driving device 130 may comprise at least one integrated circuit, and this at least one integrated circuit may be connected to a bonding pad of a display panel 110 in a tape automated bonding (TAB) method or a chip-on-glass (COG) method, directly formed on a display panel 110, or integrated on a display panel 110 depending on a case. In addition, a data driving device 130 may be formed in a chip-on-film (COF) type.

According to an embodiment, when driving voltages are applied to the data driving device 130 and the data processing device 140, the data driving device 130 may perform a low-speed communication with the data processing device 140 in order to configure an environment for a high-speed communication with the data processing device 140. Here, the high-speed communication may have a clock frequency of several giga bps and the low-speed communication may have a clock frequency lower than that of the high-speed communication (for example, several mega bps). The configuration of an environment for a high-speed communication may comprise the configuration of a frequency bandwidth for a high-speed communication, the configuration of an equalizer comprised in the data driving device 130, etc.

After having configured the environment for a high-speed communication by performing a low-speed communication with the data processing device 140, the data driving device 130 may receive from the data processing device 140 a clock pattern indicating a communication clock for the communication with the data processing device 140 and perform a clock training. Here, the clock training may be to synchronize a clock inside the data driving device 130 with the communication clock.

When the clock training is normally completed, the data driving device 130 may output a first signal indicating that the communication status of the data driving device 130 is stable and transmit it to the data processing device 140. The first signal may be referred to as a lock signal.

Subsequently, the data driving device 130 may receive from the data processing device 140 an initial configuration value regarding the environment for a high-speed communication and store the initial configuration value as a configuration restoration value. Here, the data driving device 130 may store the initial configuration value, that is, the configuration restoration value in a volatile memory (for example, RAM) comprised therein.

According to an embodiment, the initial configuration value may comprise a frequency bandwidth for a high-speed communication, a configuration value of an equalizer comprised in the data driving device 130, etc.

Here, the low-speed communication between the data driving device 130 and the data processing device 140 may be performed until the configuration of the environment for a high-speed communication and the clock training are completed and, after the clock training has been completed, a high-speed communication between the data driving device 130 and the data processing device 140 may be performed.

In other words, the data driving device 130 may receive an initial configuration value from the data processing device 140 by using the high-speed communication.

After storing the initial configuration value as the configuration restoration value, the data driving device 130 may periodically receive image data from the data processing device 140 by the high-speed communication and process the image data.

In other words, the data driving device 130 may generate a data voltage Vp according to image data and supply the data voltage Vp to a sub-pixel SP.

If any abnormality occurs in the high-speed communication due to noise such as static inside the display device 100 while the data driving device 130 periodically receives and processes image data, the data driving device 130 may detect the abnormality. For example, the data driving device 130 may detect the abnormality in the high-speed communication by checking the desynchronization of an inner clock with a communication clock due to noise, the change of the configuration of an environment for a high-speed communication due to noise or the like. Here, the data driving device 130 may change a first signal into a second signal and transmit the second signal to the data processing device 140. The second signal may indicate that the communication status is unstable. The second signal may be referred to as a lock fail signal or as an unlock signal.

Conventionally, when any abnormality is detected in a high-speed communication of the data driving device 130, a low-speed communication needs to be performed again in order to re-configure the environment for the high-speed communication.

However, according to an embodiment, the data driving device 130 may rapidly restore the configuration of the environment for a high-speed communication by using a stored configuration restoration value.

Descriptions in detail in this regard will be presented below referring to FIGS. 6A and 6B.

After having restored the configuration of the environment for the high-speed communication by using the stored configuration restoration value, the data driving device 130 may receive a clock pattern from the data processing device 140 by the high-speed communication and re-perform a clock training.

If the clock training is not completed, the data driving device 130 may re-perform the low-speed communication with the data processing device in order to re-configure the environment for the high-speed communication and re-perform a clock training. In other words, in a case when the configuration of the environment for the high-speed communication is not properly restored because an error occurs in a stored configuration restoration value due to noise, the data driving device 130 performs a process of configuring the environment for the high-speed communication.

In order to prevent in advance such a situation described above, the data driving device 130 may periodically check whether there is any error in the stored configuration restoration value due to an external influence such as noise.

The data driving device 130 may periodically receive an initial configuration value from the data processing device 140 by the high-speed communication and compare the received initial configuration value with the stored configuration restoration value.

In a case when the received initial configuration value is identical to the stored configuration restoration value, the data driving device 130 may keep the stored configuration restoration value.

In a case when the received initial configuration value is different from the stored configuration restoration value, the data driving device 130 may perform the low-speed communication with the data processing device 140 in order to re-configure the environment for the high-speed communication. The received initial configuration value being different from the stored configuration restoration value means that there is abnormality in the data driving device 130 or the data processing device 140 due to an external influence. Accordingly, the environment for the high-speed communication between the data driving device 130 and the data processing device 140 may be re-configured.

In addition, the data driving device 130 may receive a clock pattern from the data processing device 140 and re-perform a clock training.

Subsequently, the data driving device 130 may receive a re-configuration value for re-configuring the environment for the high-speed communication from the data processing device 140 and update the stored configuration restoration value with the re-configuration value.

The data driving device 130 may periodically check whether any error occurs in the stored configuration restoration value by using at least one of a parity check method, a cyclical redundancy check (CRC) method, and a checksum method. In a case when any error is confirmed in the stored configuration restoration value, the data driving device 130 may re-receive the initial configuration value from the data processing device 140 and update the configuration restoration value having an error, that is, the stored configuration restoration value with the re-received initial configuration value.

According to an embodiment, the configuration of the environment for the high-speed communication, the transmission and reception of the clock pattern, the transmission and reception of the image data, and the transmission and reception of the initial configuration value between the data driving device 130 and the data processing device 140 may be performed through a main line ML shown in FIG. 1. Here, the configuration of the environment for the high-speed communication and the transmission and reception of the clock pattern may be performed by the low-speed communication and the transmission and the reception of the image data and the transmission and reception of the initial configuration value may be performed by the high-speed communication.

The transmission of the first signal or the second signal from the data driving device 130 may be performed through a first auxiliary line AL1 and the transmission of a third signal indicating that the initial configuration value and the configuration restoration value are different, the transmission of a fourth signal to request the initial configuration value from the data processing device 140, the transmission of the stored configuration restoration value, and the reception of the initial configuration value may be performed through a second auxiliary line AL2. Here, the second auxiliary line AL2 may be a low-voltage differential signaling (LVDS) bus line. A LVDS bus line may have a good noise-resistance.

The data processing device 140 may supply control signals to the gate driving device 120 and the data driving device 130. For example, the data processing device 140 may transmit a gate control signal GCS to initialize a scan to the gate driving device 120, output image data to the data driving device 130, and transmit a data control signal to control the data driving device 130 to supply a data voltage Vp to each sub-pixel SP. The data processing device 140 may be referred to as a timing controller.

An image processing device 150 may generate image data IMG and transmit the image data IMG to the data processing device 140. The image processing device 150 may be referred to as a host.

According to an embodiment, when driving voltages VCC are supplied to the data driving device 130 and the data processing device 140, the data processing device 140 may perform a low-speed communication with the data driving device 130 through the main line ML to configure the environment for a high-speed communication with the data driving device 130.

After having completed the configuration of the environment for a high-speed communication by the low-speed communication with the data driving device 130, the data processing device 140 may store an initial configuration value regarding the configuration of the environment for the high-speed communication. The data driving device 130 may store the initial configuration value in a volatile memory (for example, RAM) comprised therein.

After having configured the environment for the high-speed communication, the data processing device 140 may transmit a clock pattern indicating a communication clock to the data driving device 130 so that a clock training may be performed in the data driving device 130. The data processing device 140 may transmit the clock pattern to the data driving device 130 through the main line ML.

When the clock training in the data driving device 130 is completed, the data processing device 140 may transmit the stored initial configuration value to the data driving device 130. The data processing device 140 may transmit the stored initial configuration value to the data driving device 130 by the high-speed communication after having transmitted the clock pattern to the data driving device 130 by the low-speed communication. When receiving a first signal from the data driving device 130 through the first auxiliary line AL1, the data processing device 140 may identify that the clock training in the data driving device 130 is completed.

Subsequently, the data processing device 140 may periodically transmit image data to the data driving device 130 by the high-speed communication. The image data may be transmitted through the main line ML.

According to an embodiment, in a case when the data processing device 140 receives a second signal from the data driving device 130 through the first auxiliary line AL1, the data processing device 140 may transmit a clock pattern to the data driving device 130 through the main line ML without performing the re-configuration of the environment for the high-speed communication. Here, the data processing device 140 may transmit the clock pattern by the high-speed communication.

Even after having transmitted the clock pattern to the data driving device 130, in a case when the data processing device 140 receives the second signal from the data driving device 130, the data processing device 140 may re-perform the low-speed communication with the data driving device 130 in order to re-configure the environment for the high-speed communication.

According to an embodiment, even in a case when receiving from the data driving device 130 a third signal indicating that the initial configuration value is different from the configuration restoration value, the data processing device 140 may re-perform the low-speed communication with the data driving device 130 in order to re-configure the environment for the high-speed communication. Here, the data processing device 140 may receive the third signal through the second auxiliary line AL2.

In a case when receiving a fourth signal from the data driving device 130 through the second auxiliary line AL2, the data processing device 140 may transmit the stored initial configuration value to the data driving device 130 through the second auxiliary line AL2.

According to an embodiment, the data processing device 140 as well may periodically check whether any error occurs in the stored initial configuration value by using at least one of the parity check method, the cyclical redundancy check method, and the checksum method.

When confirming that there is an error in the stored initial configuration value, the data processing device 140 may receive the configuration restoration value from the data driving device 130 and update the stored initial configuration value with the configuration restoration value. Here, the data processing device 140 may transmit a fifth signal to the data driving device 130 through the second auxiliary line AL2 in order to request the configuration restoration value and receive the configuration restoration value transmitted from the data driving device 130 through the second auxiliary line AL2. In other words, the data processing device 140 may receive the configuration restoration value in a form of a low-voltage differential signaling.

Figure 2:
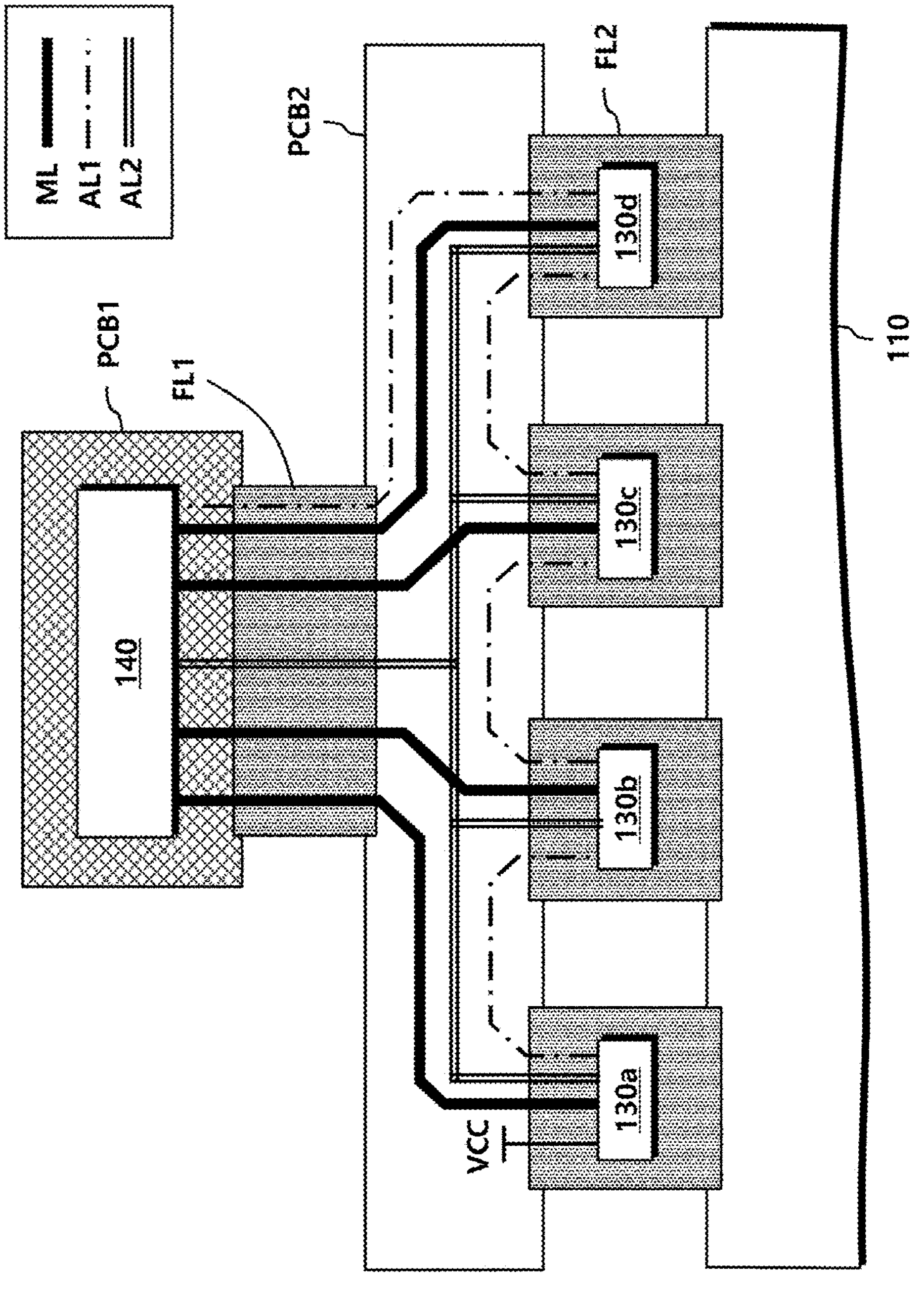
FIG. 2 is a configuration diagram of a data transmission and reception system according to an embodiment.

FIG. 2 is a configuration diagram of a data transmission and reception system according to an embodiment.

Referring to FIG. 2, a data transmission and reception system may comprise at least one data processing device 140 and a plurality of data driving devices 130*a*, 130*b*, 130*c*, 130*d*.

The data processing device 140 may be disposed on a first printed circuit board (PCB) PCB1 and connected with the plurality of data driving devices 130*a*, 130*b*, 130*c*, 130*d* through main lines ML, first auxiliary lines AL1, and second auxiliary lines AL2.

The main lines ML, the first auxiliary lines AL1, and the second auxiliary lines AL2 may respectively reach the plurality of data driving devices 130*a*, 130*b*, 130*c*, 130*d* via the first printed circuit board PCB1 and a second printed circuit board PCB2.

The first printed circuit board PCB1 and the second printed circuit board PCB2 may be connected by a first film FL1 formed of a flexible material. The main lines ML, the first auxiliary lines AL, and the second auxiliary lines AL2 may be extended from the first printed circuit board PCB1 to the second printed circuit board PCB2 via the first film FL1.

Each of the data driving devices 130*a*, 130*b*, 130*c*, 130*d* may be disposed on a second film FL2 in a chip-on-film (COF) form. The second film FL2 may be a support substrate formed of a flexible material connecting the second printed circuit board PCB2 and the display panel 110. The main lines ML, the first auxiliary lines AL1, and the second auxiliary lines AL2 may be extended from the second printed circuit board PCB2 to the data driving devices 130*a*, 130*b*, 130*c*, 130*d* respectively via second films FL2.

The main lines ML may connect the data processing device 140 and the respective data driving devices 130*a*, 130*b*, 130*c*, 130*d* in a one-on-one way.

The first auxiliary lines AL1 may connect adjacent data driving devices 130*a*, 130*b*, 130*c*, 130*d* or the data driving device 130*d* and the data processing device 140 without the first auxiliary line AL1 and the main line ML overlapping each other in a plane. For example, a first data driving device 130*a* may be connected with a second data driving device 130*b* by a first auxiliary line AL1 and the second data driving device 130*b* may be connected with a third data driving device 130*c* by a first auxiliary line AL1.

Figure 3:
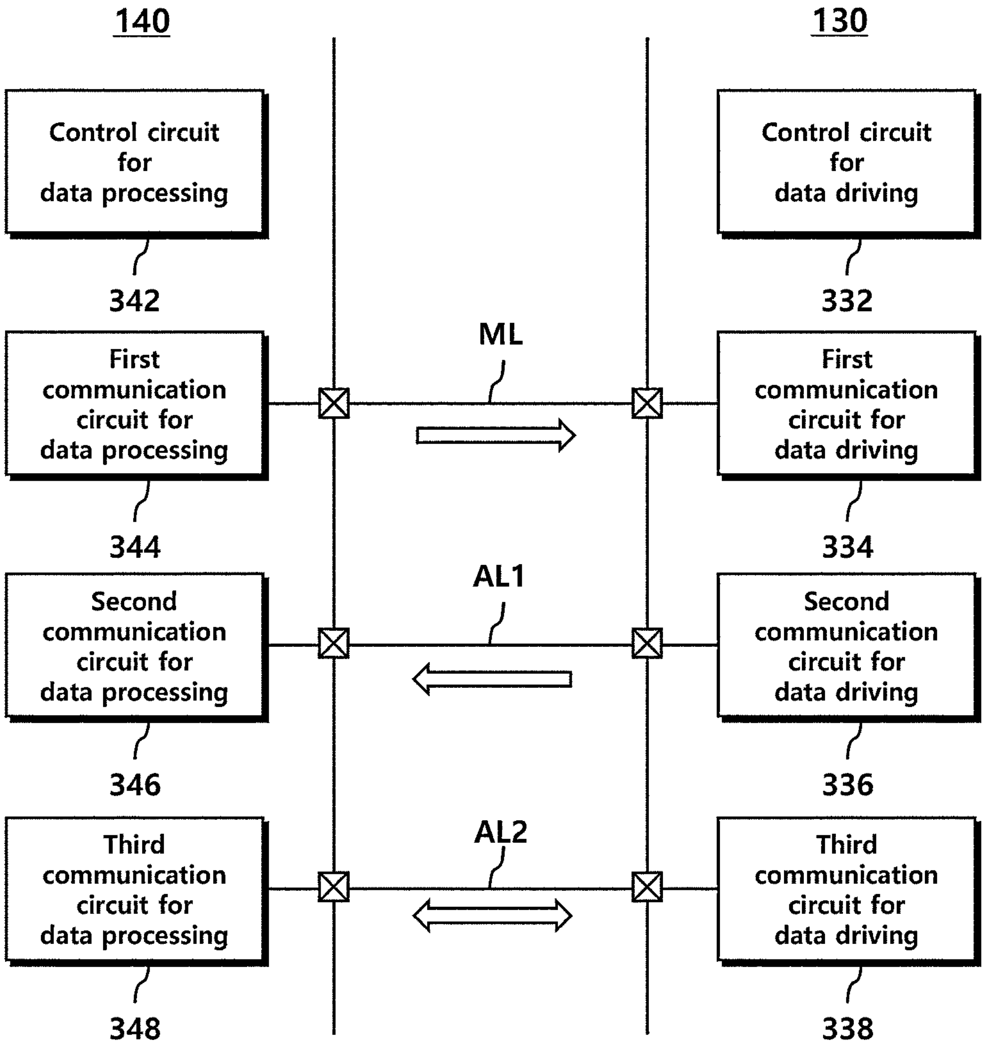
FIG. 3 is a configuration diagram of a data processing device and a data driving device according to an embodiment.

FIG. 3 is a configuration diagram of a data processing device and a data driving device according to an embodiment.

Referring to FIG. 3, the data processing device 140 may comprise a control circuit for data processing 342, a first communication circuit for data processing 344, a second communication circuit for data processing 346, and a third communication circuit for data processing 348.

The data driving device 130 may comprise a control circuit for data driving 332, a first communication circuit for data driving 334, a second communication circuit for data driving 336, and a third communication circuit for data driving 338.

The first communication circuit for data processing 344 and the first communication circuit for data driving 334 may be connected through a main line ML. The first communication circuit for data processing 344 may transmit information, a clock pattern, image data, and an initial configuration value for configuring a high-speed communication environment to the first communication circuit for data driving 334 through the main line ML. Here, information and a clock pattern for configuring a high-speed communication environment may be transmitted by a low-speed communication and image data and an initial configuration value may be transmitted by a high-speed communication.

The second communication circuit for data processing 346 and the second communication circuit for data driving 336 may be connected through a first auxiliary line AL1. The second communication circuit for data driving 336 may transmit a first signal and a second signal to the second communication circuit for data processing 346 through the first auxiliary line AL1.

The third communication circuit for data processing 348 and the third communication circuit for data driving 338 may be connected through a second auxiliary line AL2. The third communication circuit for data driving 338 may transmit a third signal or a fourth signal to the third communication circuit for data processing 348 through the second auxiliary line AL2.

The third communication circuit for data driving 338 may also transmit a configuration restoration value to the third communication circuit for data processing 348 through the second auxiliary line AL2.

The third communication circuit for data processing 348 may transmit a fifth signal or an initial configuration value to the third communication circuit for data driving 338 through the second auxiliary line AL2.

Here, the third signal may be a signal indicating that the initial configuration value and the configuration restoration value are different from each other, the fourth signal may be a signal to request the initial configuration value from the data processing device 140, and the fifth signal may be a signal to request the configuration restoration value from the data driving device 130.

According to an embodiment, the second auxiliary line AL2 may be a low-voltage differential signaling (LVDS) bus line. Since a low-voltage differential signaling bus line has a high noise-resistance, when data is transmitted or received through the second auxiliary line AL2, it is possible to prevent errors in data transmission/reception due to noise.

Figure 4:
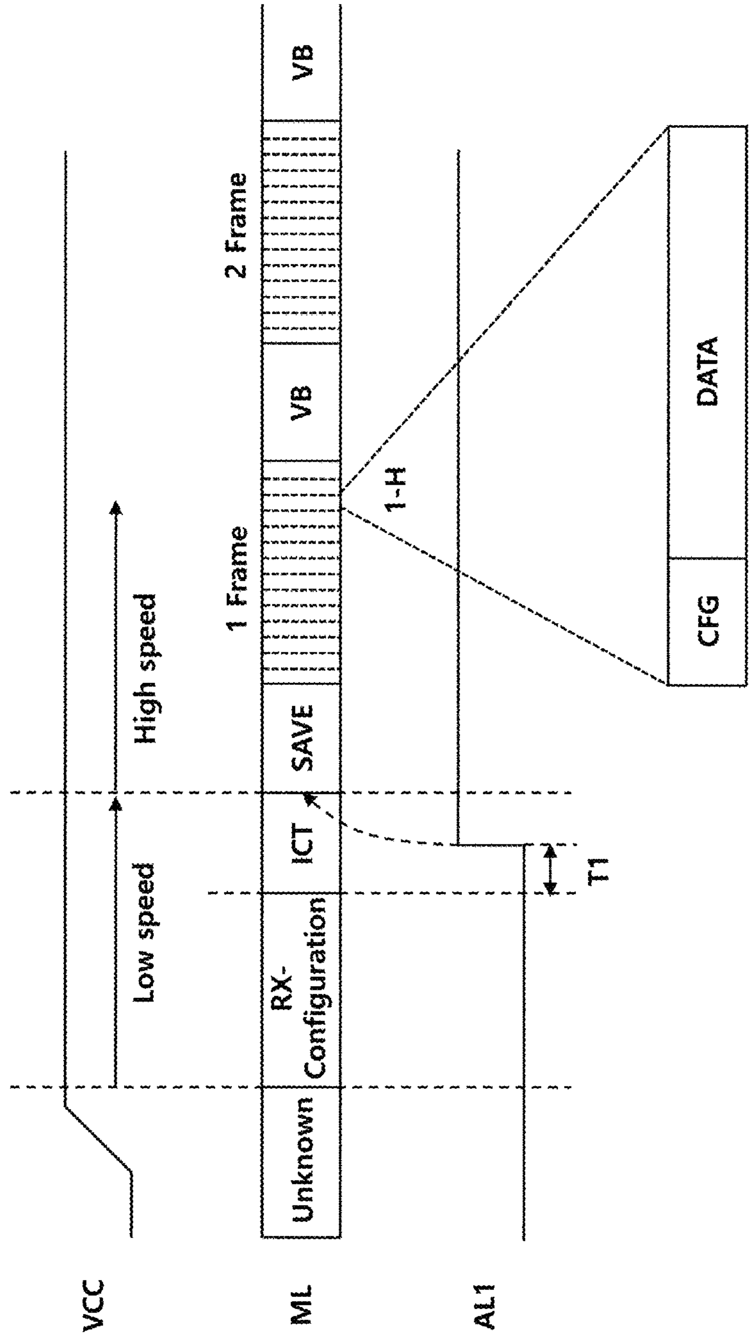
FIG. 4 and FIG. 5 are diagrams respectively illustrating data transmission and reception sequences in a main line and a first auxiliary line according to an embodiment.
Figure 5:
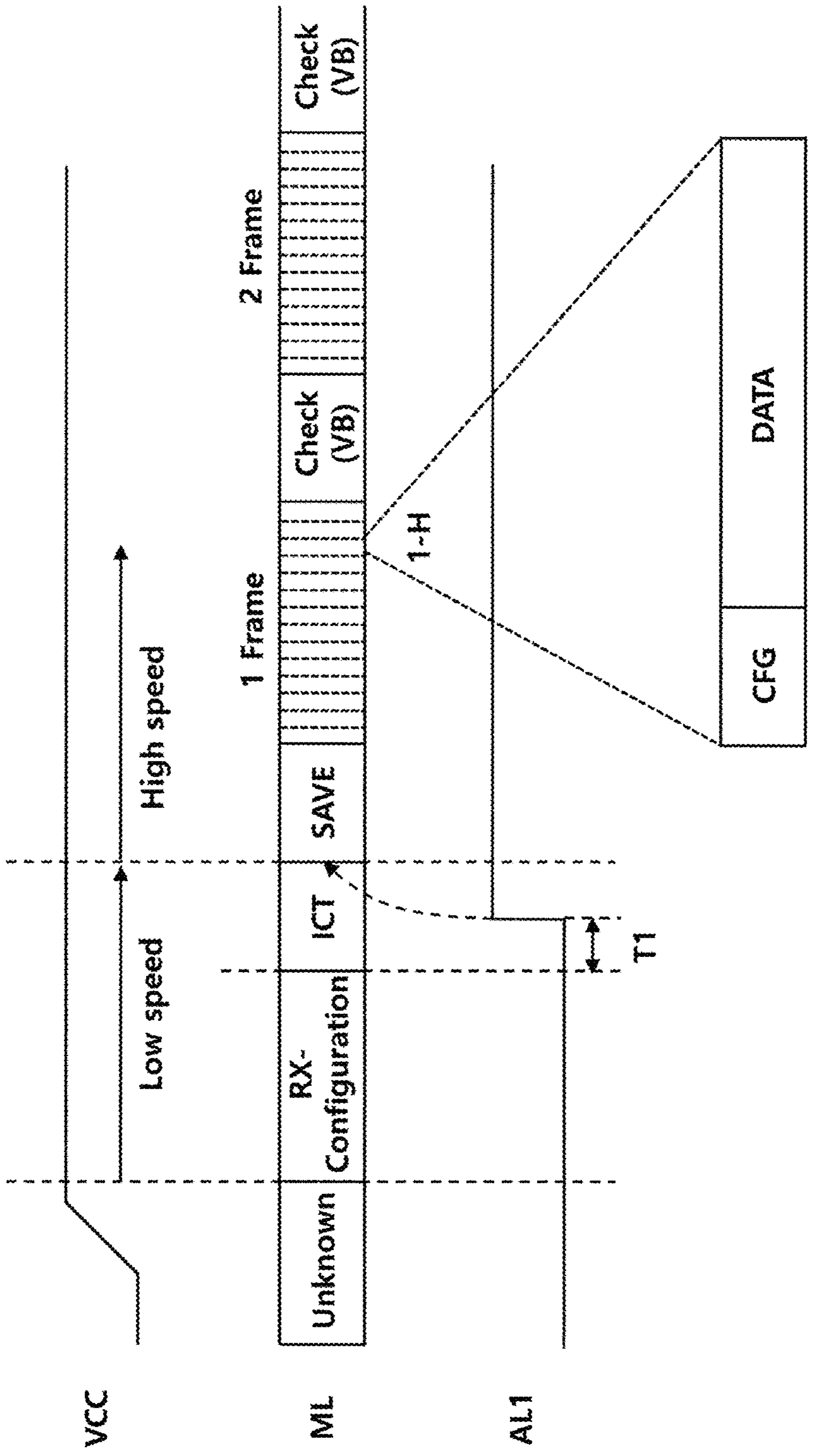

FIG. 4 and FIG. 5 are diagrams respectively illustrating data transmission and reception sequences in a main line and a first auxiliary line according to an embodiment.

When driving voltages VCC are supplied to the data driving device 130 and the data processing device 140, the environment for a high-speed communication between the data driving device 130 and the data processing device 140 may be configured. Subsequently, the data processing device 140 may transmit a clock pattern to the data driving device 130.

The data driving device 130 may receive a clock pattern and perform a training of a communication clock according to the clock pattern. After completing the training of the communication clock, the data driving device 130 may change a voltage of a signal formed in the first auxiliary line AL1 from a second level (for example, a low level) to a first level (for example, a high level).

The data processing device 140 and the data driving device 130 may communicate with each other in a phase locked loop (PLL) method. In such a method, the data driving device 130 may generate an internal clock in conformity with a frequency and a phase of a clock pattern.

The data driving device 130 may complete a clock training within a time limit T1 for training. The data processing device 140 may transmit a clock pattern during an initial clock training (ICT) time section comprising a predetermined margin time so as to be longer than the time limit T1.

The clock training may be performed in an early stage of data transmission. In addition, when a link between the data processing device 140 and the data driving device 130 is lost, the clock training may be performed again.

After the clock training has been completed, the data processing device 140 may transmit an initial configuration value for configuring the environment for a high-speed communication to the data driving device 130, and subsequently, transmit image data to the data driving device 130 through the main line ML.

According to an embodiment, a low-speed communication may be performed between the data driving device 130 and the data processing device 140 while an environment for a high-speed communication is configured and a clock training is performed and a high-speed communication may be performed therebetween after the clock training has been completed.

Meanwhile, the image data may be transmitted in every frame and there may be a frame blank time section (vertical blank: VB) between two adjacent frames, each for image data transmission. A time section remaining after excluding the frame blank time section may be referred to as a frame active time section.

As described above, the data processing device 140 may transmit image data to the data driving device 130 in every frame and transmit a stored initial configuration value thereto in a frame blank time section between one frame and another frame as shown in FIG. 5.

Here, one frame may comprise a plurality of sub time sections and image data may be transmitted during one sub time section.

For example, one frame may comprise a plurality of H (H: horizontal) time sections 1-H (horizontal periods) respectively corresponding to a plurality of lines of pixels in the display panel.

The data processing device 140 may transmit image data corresponding to each line during every H time section 1-H.

An H time section 1-H, for example, may comprise a configuration transmission section and an image transmission section with respect to the data processing device 140. The data processing device 140 may transmit image data in the image transmission section of an H time section 1-H. An H time section 1-H may comprise a configuration reception section CFG and an image reception section DATA with respect to the data driving device 130. The data driving device 130 may receive image data in an image reception section DATA.

Meanwhile, the data driving device 130 may check configuration data and image data and, in a case when the configuration data or the image data is beyond predetermined regulations, for example, in a case when there is any abnormality in a high-speed communication of the device due to noise such as static, the data driving device 130 may generate a second signal, which is a lock fail signal. In other words, the data driving device 130 may change the level of a voltage of a signal formed in the first auxiliary line AL1 from a first level (for example, a high level) into a second level (for example, a low level).

The lock fail signal may indicate that the link between the data processing device 140 and the data driving device 130 is lost.

Figure 6A:
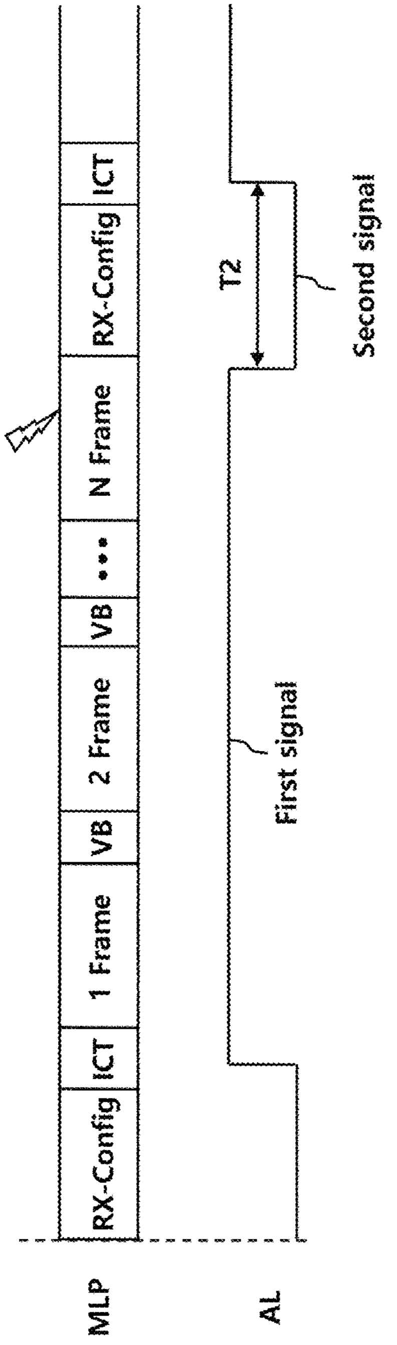
FIG. 6A and FIG. 6B are diagrams respectively illustrating a data transmission and reception sequence in a main line and a first auxiliary line according to an embodiment and a general data transmission and reception sequence in a main line and a first auxiliary line.
Figure 6B:
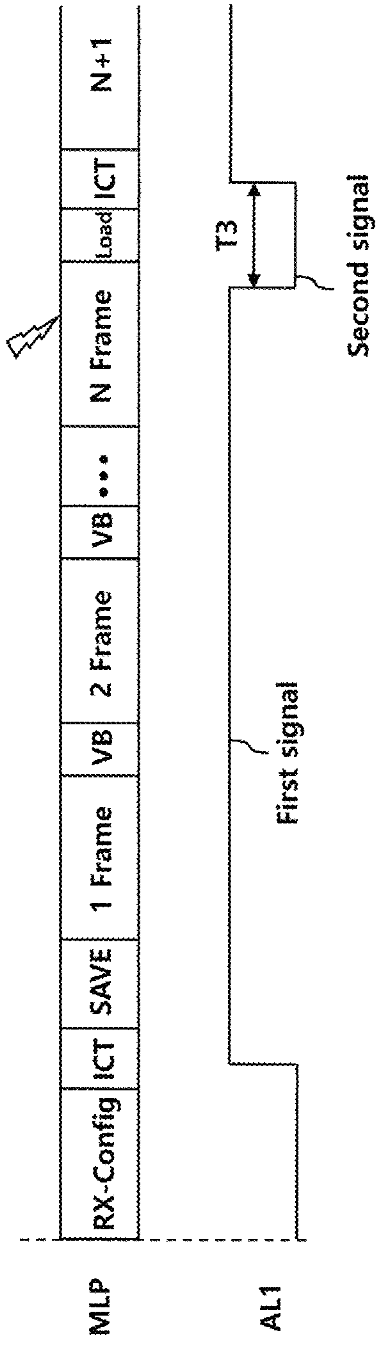

In such a case, a general data driving device and a general data processing device perform again the configuration of an environment for a high-speed communication by using a low-speed communication as shown in FIG. 6A. For this reason, it takes a long time T2 until the link between the data driving device and the data processing device is restored to its normal state.

However, according to an embodiment, the data driving device 130 receives an initial configuration value from the data processing device 140 and stores it as a configuration restoration value. When the link between the data processing device 140 and the data driving device 130 is lost, that is, when a first signal is changed to a second signal as shown in FIG. 6B, the data driving device 130 may rapidly restore the environment for a high-speed communication by using the stored configuration restoration value. Accordingly, it is possible to reduce a time T3 that it takes for the restoration of the link between the data driving device 130 and the data processing device 140.

Hereinafter, the process of transmitting and receiving data between the data driving device and the data processing device will be described.

Figure 7:
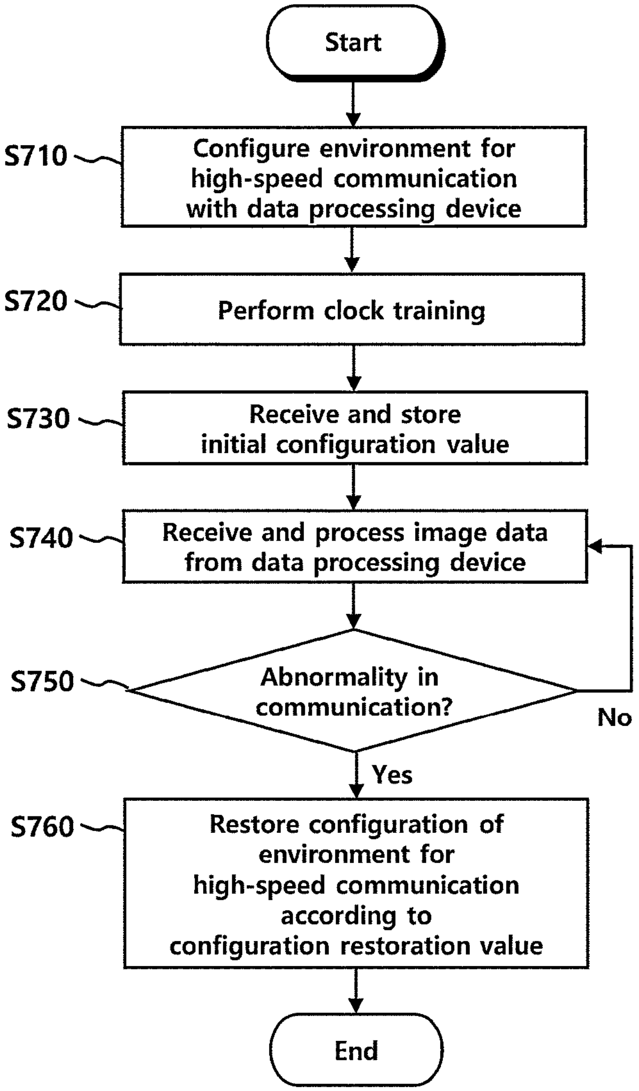
FIG. 7 is a flow diagram illustrating a process of transmitting and receiving data in a data driving device.

FIG. 7 is a flow diagram illustrating a process of transmitting and receiving data in a data driving device.

Referring to FIG. 7, when driving voltages VCC are applied to the data driving device 130 and the data processing device 140, the data driving device 130 may perform a low-speed communication with the data processing device 140 for configuring an environment for a high-speed communication with the data processing device 140 (S710).

After having configured the environment for a high-speed communication, the data driving device 130 may receive from the data processing device 140 a clock pattern indicating a communication clock for the communication with the data processing device 140 and perform a clock training (S720). After having normally completed the clock training, the data driving device 130 may output a first signal indicating that the state of communication is stable and transmit it to the data processing device 140.

After S720, the data driving device 130 may receive from the data processing device 140 an initial configuration value regarding the configuration of the environment for a high-speed communication and store it as a configuration restoration value (S730). Here, in S710 and S720, a low-speed communication may be performed between the data driving device 130 and the data processing device 140 and a high-speed communication may be performed between the data driving device 130 and the data processing device 140 from S730.

After having stored the initial configuration value as a configuration restoration value as described above, the data driving device 130 may periodically receive image data from the data processing device 140 by a high-speed communication and process the image data (S740).

In a case when there is any abnormality in a high-speed communication due to noise such as static occurring inside the display device 100 while the data driving device 130 periodically receives image data and processes the same, the data driving device 130 may restore the configuration of the environment for a high-speed communication according to the stored configuration restoration value (S750, S760).

In a case when no abnormality occurs in the high-speed communication in S750, the data driving device 130 may perform the operation of S740.

Meanwhile, the data driving device 130 may change the first signal to the second signal and transmit the second signal to the data processing device 140 in S760. Here, the second signal may be a signal indicating that the state of communication is unstable.

According to an embodiment, the data driving device 130 may receive a clock pattern from the data processing device 140 by a high-speed communication and re-perform a clock training after S760.

When the re-performed clock training is not completed, the data driving device 130 may re-perform a low-speed communication with the data processing device 140 for re-configuring the environment for a high-speed communication and perform the clock training again.

After S730, the data driving device 130 may receive an initial configuration value from the data processing device 140 in every predetermined period by a high-speed communication and compare the received initial configuration value with a stored configuration restoration value.

In a case when the initial configuration value and the stored configuration restoration value are identical when comparing the initial configuration value and the stored configuration restoration value, the data driving device 130 may keep the stored configuration value.

In a case when the initial configuration value and the stored configuration restoration value are different, the data driving device 130 may perform a low-speed communication with the data processing device 140 for re-configuring the environment for a high-speed communication.

In addition, the data driving device 130 may receive a clock pattern from the data processing device 140 and re-perform a clock training.

Subsequently, the data driving device 130 may receive from the data processing device 140 a re-configuration value for re-configuring the environment for a high-speed communication and update the stored configuration restoration value with the re-configuration value.

After S730, the data driving device 130 may periodically check if there is any error in the stored configuration restoration value by using at least one of the parity check method, a cyclical redundancy check method, and a checksum method. When confirming that there is an error in the stored configuration restoration value, the data driving device 130 may re-receive an initial configuration value from the data processing device 140.

The data driving device 130 may update the configuration restoration value comprising an error, that is, the stored configuration restoration value with the re-received initial configuration value.

The above-described process may be repeated while driving voltages VCC are applied to the data driving device 130 and the data processing device 140. When the driving voltages VCC stops being applied thereto, the above-described process may be ended.

Figure 8:
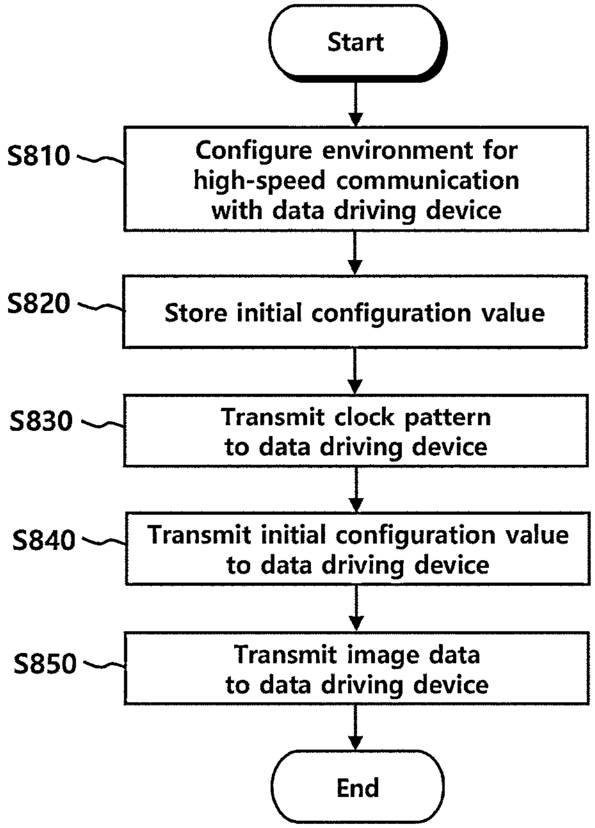
FIG. 8 is a flow diagram illustrating a process of transmitting and receiving data in a data processing device.

FIG. 8 is a flow diagram illustrating a process of transmitting and receiving data in a data processing device.

Referring to FIG. 8, when driving voltages VCC are supplied to the data driving device 130 and the data processing device 140, the data processing device 140 may perform a low-speed communication with the data driving device 130 to configure an environment for a high-speed communication with the data driving device 130 (S810).

After having completed the configuration of the environment for a high-speed communication with the data driving device 130 by using a low-speed communication, the data processing device 140 may store an initial configuration value for the configuration of the environment for a high-speed communication (S820).

After having configured the environment for a high-speed communication, the data processing device 140 may transmit a clock pattern, indicating a communication clock, to the data driving device 130 so that the data driving device 130 may perform a clock training (S830).

When the clock training in the data driving device 130 is completed, the data processing device 140 may transmit the stored initial configuration value to the data driving device 130 (S840). Here, the data processing device 140 may transmit the clock pattern to the data driving device 130 by a low-speed communication, and then, transmit the initial configuration value to the data driving device 130 by a high-speed communication.

Subsequently, the data processing device 140 may periodically transmit image data to the data driving device 130 by a high-speed communication (S850).

After S850, the data processing device 140 may periodically check if there is any error in the stored initial configuration value by using at least one of the parity check method, a cyclical redundancy check method, and a checksum method.

When confirming that there is an error in the stored initial configuration value, the data processing device 140 may receive a configuration restoration value from the data driving device 130 and update the stored initial configuration value with the configuration restoration value. Here, the data processing device 140 may receive the configuration restoration value in a form of a low-voltage differential signal.

The above-described process may be repeated while driving voltages VCC are applied to the data driving device 130 and the data processing device 140. When the driving voltages VCC stops being applied thereto, the above-described process may be ended.

What is claimed is:

1. A data transmission and reception method of a data driving device comprising:

configuring an environment for a high-speed communication with a data processing device by performing a low-speed communication with the data processing device, the low-speed communication having a clock frequency lower than that of the high-speed communication;

receiving a clock pattern from the data processing device and performing a clock training;

storing an initial configuration value as a configuration restoration value after having received the initial configuration value regarding the environment for a high-speed communication from the data processing device; and restoring the environment for a high-speed communication according to the configuration restoration value when any abnormality is detected in the high-speed communication while periodically receiving image data from the data processing device by the high-speed communication and processing the image data, wherein the performing the clock training includes transmitting a first status signal indicating completion of the clock training and, when any abnormality is detected in the high-speed communication in restoring a configuration of the environment, transmitting a second status signal changed from the first status signal to the data processing device.

2. The data transmission and reception method of claim 1 further comprising after restoring the environment for a high-speed communication:

receiving a clock pattern from the data processing device by the high-speed communication and re-performing the clock training; and re-performing the low-speed communication with the data processing device in order to re-configure the environment for the high-speed communication when the re-performed clock training is not completed.

3. The data transmission and reception method of claim 1 further comprising after storing an initial configuration value:

receiving an initial configuration value from the data processing device and comparing the initial configuration value with the configuration restoration value in every predetermined period;

re-configuring the environment for a high-speed communication by performing the low-speed communication with the data processing device when the initial configuration value is different from the configuration restoration value;

receiving a clock pattern from the data processing device and re-performing the clock training; and receiving a re-configuration value for re-configuring the environment for a high-speed communication and updating the configuration restoration value with the re-configuration value.

4. The data transmission and reception method of claim 1 further comprising after storing an initial configuration value:

periodically checking whether any error occurs in the stored configuration restoration value;

re-receiving an initial configuration value from the data processing device when any error is confirmed in the configuration restoration value; and updating the configuration restoration value having an error with a re-received initial configuration value.

5. The data transmission and reception method of claim 1, wherein the initial configuration value comprises a frequency bandwidth of a high-speed communication and a configuration value for an equalizer comprised in the data driving device.

6. A data transmission and reception method of a data processing device comprising:

configuring an environment for a high-speed communication with a data driving device by performing a low-speed communication with the data driving device, the high-speed communication having a clock frequency higher than that of the low-speed communication;

storing an initial configuration value regarding the environment for the high-speed communication;

transmitting the initial configuration value to the data driving device after having transmitted a clock pattern indicating a communication clock for the data driving device; and periodically transmitting image data to the data driving device by the high-speed communication, wherein the performing the clock training includes transmitting a first status signal indicating completion of the clock training and, when any abnormality is detected in the high-speed communication in restoring a configuration of the environment, transmitting a second status signal changed from the first status signal to the data processing device.

7. The data transmission and reception method of claim 6, further comprising after transmitting the initial configuration value:

periodically checking whether any error occurs in the stored initial configuration value;

receiving from the data driving device a configuration restoration value, which is an initial configuration value stored in the data driving device, when any error is confirmed in the stored initial configuration value; and updating the stored initial configuration value with the configuration restoration value.

8. The data transmission and reception method of claim 7, further checking whether any error occurs in the stored initial configuration value by using at least one of a parity check method, a cyclical redundancy check (CRC) method, and a checksum method.

9. The data transmission and reception method of claim 7, further comprising receiving the configuration restoration value in a form of a low-voltage differential signaling (LVDS).

10. The data transmission and reception method of claim 6, further comprising transmitting the clock pattern to the data driving device by the low-speed communication, and then, transmitting the initial configuration value to the data driving device by the high-speed communication.

11. A data transmission and reception system comprising:

a data processing device to store an initial configuration value regarding an environment for a high-speed communication, to transmit a clock pattern indicating a communication clock, to transmit the initial configuration value, and to periodically transmit image data by a high-speed communication; and a data driving device to perform a low-speed communication with the data processing device in order to configure an environment for the high-speed communication, the low-speed communication having a clock frequency lower than that of the high-speed communication, to receive the clock pattern to train the communication clock according to the clock pattern, to receive the initial configuration value to store the same as a configuration restoration value, and to restore the configuration of the environment for the high-speed communication according to the configuration restoration value when any abnormality is detected in the high-speed communication while periodically receiving image data by the high-speed communication and processing the same, wherein the performing the clock training includes transmitting a first status signal indicating completion of the clock training and, when any abnormality is detected in the high-speed communication in restoring a configuration of the environment, transmitting a second status signal changed from the first status signal to the data processing device.

12. The data transmission and reception system of claim 11, wherein the data processing device is configured to periodically check whether any error occurs in the stored initial configuration value and, when any error is confirmed in the stored initial configuration value, receive the configuration restoration value from the data driving device to update the stored initial configuration value with the configuration restoration value.

13. The data transmission and reception system of claim 12 further comprising:

a main line through which the initial configuration value, the clock pattern, and the image data are transmitted from the data processing device to the data driving device; and an auxiliary line through which the configuration restoration value is transmitted from the data driving device to the data processing device.

14. The data transmission and reception system of claim 13, wherein the auxiliary line is a low-voltage differential signaling (LVDS) bus line.

15. The data transmission and reception system of claim 11, wherein the data processing device is configured to transmit image data to the data driving device in every frame and, in a frame blank section between one frame and another frame, transmit a stored initial configuration value to the data driving device.

16. The data transmission and reception system of claim 15, wherein the data driving device is configured to compare the stored initial configuration value with the configuration restoration value and perform the low-speed communication with the data processing device in order to re-configure the environment for the high-speed communication when the stored initial configuration value is different from the configuration restoration value.

* * * * *